Figure 1:
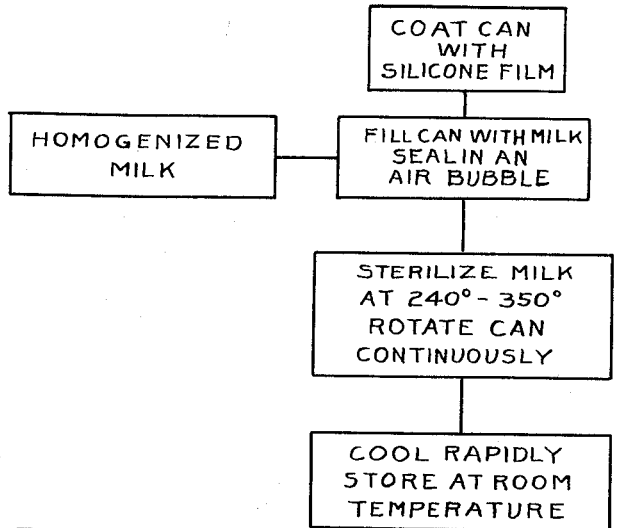

Feb. 23, 1960 R. J. HERBOLD 2,926,094
METHOD OF PROCESSING AND STERILIZING MILK
Filed July 16, 1957

INVENTOR.
Robert J. Herbold
BY
Clayton L. Zensen
ATTORNEY

United States Patent Office 2,926,094
Patented Feb. 23, 1960

2,926,094

A METHOD OF PROCESSING AND STERILIZING MILK

Robert J. Herbold, Denver, Colo.

Application July 16, 1957, Serial No. 672,240

3 Claims. (Cl. 99—185)

This invention relates to milk processing, and more particularly to the sterilization and preservation of canned milk.

Various milk products, such as whole milk, skim milk, cream, and a chocolate emulsion in milk, as well as other milk containing products, hereinafter designated as milk, may be sealed in a heat conductive can and preserved by sterilization. The cans are usually made of tin coated iron and may have an inside lacquer or enamel coating which is supposed to prevent contact of the milk with the metal, but pin holes in the coating or in the tin plating may provide access of the milk to metal and permit chemical reaction with a detrimental effect on the milk, or in some cases deterioration of the metal and leakage of the milk from the can.

Sterilization of the milk is best effected at a comparatively high temperature, but there is a danger of the milk burning or caramelizing or otherwise being harmfully affected by the heat penetrating through the can, with the result that the canned milk may carry a scorched or cooked flavor or other undesired taste condition. The can is preferably not filled completely full because of the disadvantages involved in spilling its contents before the cover has been applied, so that an air bubble remains in the can after it has been sealed, and I employ that air bubble to stir the milk and insure a uniform heat penetration and minimize the off-flavor condition. However, I have found that the air bubble within a standard type of can is separated from the can wall by a thin film of milk and that this film tends to acquire a scorched or cooked flavor when subjected to the high sterilization temperature even though the bubble stirs the milk within the can. This condition is due primarily to the fact that the milk tends to cling to the can surface whether it is the metal of the can or any lacquer or enamel coating previously applied thereto.

The primary object of this invention is to provide a method of canning and preserving raw milk which insures that the milk may be adequately sterilized at a comparatively high temperature without acquiring a cooked, scorched or other detrimental flavor which would materially affect the quality thereof and whereby the milk may be preserved indefinitely at room temperature and will retain substantially its initial qualities which were present prior to the canning treatment. Other objects will be apparent in the following disclosure.

I have found that raw milk may be sterilized at a desired high temperature without acquiring a detrimental flavor, if the can is coated with a silicone composition which prevents the milk from adhering to the interior surface of the can and thus minimizes the danger of its acquiring an undesired flavor due to the heat.

Figure 2:
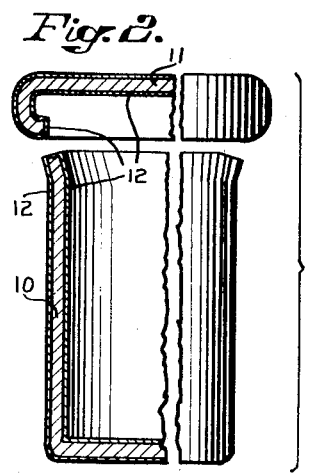
Figure 3:
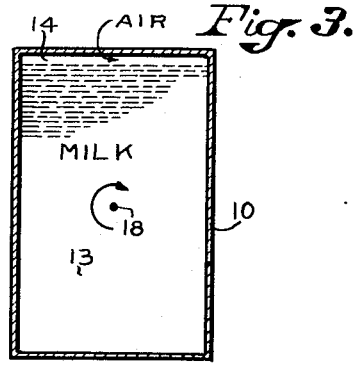
Figure 5:
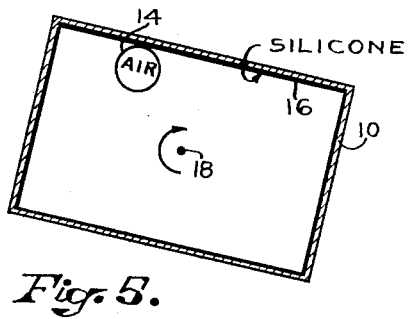
Figure 4:
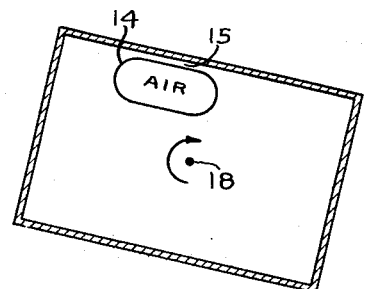

Referring to the drawings:

Fig. 1 gives a diagrammatic showing of the primary steps of the process;

Fig. 2 indicates the empty can and its cover which have been initially coated with a silicone film;

Fig. 3 is a diagrammatic sectional view of a can of milk having an air space above the milk which provides a bubble for stirring the milk during rotation of the can;

Fig. 4 is a similar view showing diagrammatically the presence of a film between the air bubble and the surface of a standard can which has not been treated with silicone and wherein a milk film tends to cling to the can; and Fig. 5 is a similar sectional view showing diagrammatically the general shape of an air bubble as it circulates within a rotating can which has been coated with the silicone film.

The preferred milk canning procedure comprises coating at least the interior can surfaces and preferably all of the surfaces of the can with a silicone film, whether or not the can has been previously coated with an enamel or lacquer, as is customary in the can making industry. This is indicated diagrammatically in Fig. 2 in which the parts 10 and 11 represent in exaggerated form a tin coated sheet iron can and its cover. The silicone coating 12 is preferably applied on all of the can surfaces so as to prevent contact of the milk with any of the can surfaces. When the can 10 is filled with the milk, a slight space is left at the top to minimize the possibility of the milk slopping over the edges during handling. Thereafter, the cover 11 is suitably applied, such as by having its flanged portion crimped into place to form a fully sealed joint. Adequate provisions are made to insure such a sealed condition, as is well understood. Thus, the milk 13 nearly fills the can, but the space 14 thereabove is filled with air which is present as a bubble during rotation of the can. If a non-coated can thus filled with milk is rotated about its center, as indicated by the arrow in Fig. 4, during the sterilizing treatment, it is found that the air bubble 14 clings to the can and assumes a flattened condition as it travels along the side of the can. That bubble is separated from the inner surface of the can by a film of milk 15 therebetween. The elongated or flattened shape of the air bubble is due primarily to the fact that surface tension of the milk film clinging to the can or to the enamel or the lacquer coating of the can hinders a free sliding movement of the air bubble thereover. Hence, there is a comparatively large surface of a milk film exposed directly to heat that passes through the can wall during the high temperature sterilization treatment.

If, on the other hand, the can is coated with a silicone film as herein described, then the air bubble 14 assumes a more or less spheroidal shape as shown in Fig. 5, and there is a minimum contact of a milk film with the silicone coating. In other words, the milk slides freely over the silicone surface and does not adhere to it materially, so that the film 15 of Fig. 4 is either absent or of such minimum dimensions that there can be no detrimental heat effect as the air bubble passes over the surface of the rotating can. It will be noted that the can is preferably rotated about an axis 18 which lies within the can itself, and preferably near the center of the can, so that centrifugal force does not throw the milk towards one side of the can and hinder the air bubble movement, which might permit exposure of an almost stationary portion of the milk to contact with a highly heated can surface for a comparatively long time. Due to the non-adhesion of the milk to the silicone coating, the air bubble passes readily around the can as the latter is rotated, and it apparently wipes the surface of the silicone coating and removes any milk that might adhere thereto. Thus, the air bubble forms an efficient agitator for the milk and insures satisfactory circulation of the heated milk at the can surface toward the interior of the can and provides for a uniform rapid heating of the can contents throughout the body. This is particularly important where high temperatures of 240° F. to 350°

F. are employed for the sterilization. After the milk has been sterilized, then the can is rapidly cooled and the milk contents may be thereafter maintained at room temperature without refrigeration for an indefinite period of time.

Referring now to the coating material, I prefer to employ a Dow Corning silicone coating of the #200 dimethylpolysiloxane series of fluids, and preferably the Dow Corning fluid #EF209 which is a 30% #200 fluid of 350 centistokes viscosity. Chemically, a silicone fluid of this general class has the formula:

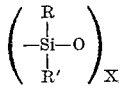

in which R and R' may be methyl, ethyl, or phenyl. The dimethyl silicone fluid of the #200 fluids is one in which the polymer is made up of a chain of units having 2 methyl groups and 2 oxygens attached to each silicon. The viscosity depends on the length of the chain. The fluid may be dissolved in a solvent, such as isopropyl alcohol, which evaporates quickly and leaves a silicone film. The preferred #200 fluids comprise a series of dimethylpolysiloxane ranging upwardly in viscosity from .065 centistoke. The preferred substance of 350 viscosity is water repellant, resistant to oxidation, odorless, tasteless, physiologically harmless, non-irritant and non-sensitizing. It is non-gumming, non-carbonizing and resistant to many gases, solids, dilute alkalis and dilute or concentrated acids. It is insoluble in water and its solubility behavior is similar to that of other non-polar liquids. It has a low surface tension and excellent heat transfer properties. The fluid of 350 centistokes has as specific gravity of 0.97 to 0.975. Its flash point is 600° F. Its viscosity temperature coefficient is 0.62. It is harmless and inert to the milk. The various milk fluids comprise emulsions of fat in an outer phase of water and they will not stick to this film. Hence, this lack of adhesion of the milk to the silicone coating provides for a proper agitation of the milk and adequate heat transfer to its interior when the can is revolved while subjected to the high temperature of the sterilizing steam bath.

The silicone is preferably applied as a substantially mono-molecular film which has a strong surface affinity for metal and the standard can coatings and adheres tightly thereto. To provide a coating as thin as possible and approaching a mono-molecular thickness, I preferably spray the can with the 30% #200 fluid which has been diluted with water under agitation to a consistency of about a 4% to 5% emulsion, as is found satisfactory for use in a spray gun. The material may be applied by an air spray, but I preferably employ steam and preheat the can to a temperature approximating 212° F. This heat treatment insures the application of a very thin film in a short time, and the heat serves to drive off the water in the emulsion and provide for a rapid set of the silicone film before it can run materially.

If desired, the milk may be pasteurized for a time period depending on the temperature such as 140° F. for 1 hour, or for 1 minute at 155° F., or for 6 seconds at 165° F., but that pretreatment is not necessary. The milk is preferably preheated to 150° F. to preserve its flavor and then homogenized. I prefer that the milk be homogenized to form fat globules of less than 2 microns diameter. This prevents subsequent separation of the fat globules from the water phase. The milk is then cooled quickly by being pumped over a water cooled surface held at 50-150° F. and then filled in the can and the sterilization procedure carried on without delay.

In accordance with my procedure, the can is filled with the milk to a point which leaves sufficient air to provide a bubble therein, so that when the silicone coated can is revolved, and preferably about a point within the can, to minimize the effects of centrifugal force, the air bubble slides freely around the can surface and it sweeps the major portion of the surface of the can. Since the milk does not adhere to the silicone coating and moves freely thereover, there is the minimum of milk film overheated by the high sterilizing temperature.

A preferred and continuous procedure may comprise loading the sealed cans into a conveyor system and moving them progressively without interruption or stoppage through a steam bath, by means of suitable apparatus. During such continuous movement the cans are rotated to insure a continuous agitation of the milk. The cans pass first through a preheating water bath and then into a steam chamber maintained at the required sterilizing temperature and are finally plunged into a cooling bath which quickly reduces the temperature of the milk to about 80° F.

The sterilization temperature may vary depending upon the locality, the season, and the type of milk being treated. In order to prevent the formation of curds, discoloration and a cooked flavor, it is preferred that the milk be subjected to a high temperature for the shortest possible time to effect the required sterilization. The steam bath is preferably held at a temperature ranging between 240° and 350° F. and the time of heat treatment will be contingent on the temperature maintained. For example, the can may be maintained for 11.6 minutes in a steam bath held at 246° F. Milk of high butter fat content, such as is used for ice cream and comprising 12% fat and 9% non-fats may be sterilized for one minute at 260° F. I prefer to employ a temperature of 260° F. or higher for a time of not over four minutes. The higher the temperature, the greater is the possibility of burning the milk or changing its flavor.

As a specific example of heat treatment, I may subject a quart can and its contents to a temperature of 265° F. in the steam bath. I have found that it requires 1.5 minutes to bring the center of the can contents to 265° F. and then from 1.5 to 2 minutes to cool the can to 80° F. That is, the milk is brought up rapidly to that sterilizing temperature of 265° F. and then cooled rapidly with a total time consumption of about 3½ minutes. Also, the high sterilizing temperature, which is above the boiling point of water, requires an external pressure on the can to balance any tendency to form steam within the can. Hence, I maintain an hydraulic head on the water and steam bath which provides that balanced pressure. During the sterilization, the can may be rotated at about 30 to 45 r.p.m. A slow rotation, such as about 35 r.p.m., provides an efficient non-violent stirring, in that the air bubble is moved steadily around the can and centrifugal force does not interfere materially with such movement.

It will now be understood that without the silicone coating an effective stirring of the milk cannot be had. The silicone coating minimizes any adherence of the milk to the container, so that the milk will be moved readily by the air bubble and it cannot remain static. Hence, the silicone coating cooperates with the air bubble agitation to insure that the milk slides freely over the can surface and cannot maintain a stationary contact with a heated part of the can long enough to create the undesired flavor. The term "milk" is to be interpreted according to standard usage as referring to milk of a required butter fat content which has substantially its original water content as distinguished from milk which has been subjected to a water evaporating operation to form substances known as evaporated and condensed milk. This milk may have been initially subjected to homogenization and to procedures for increasing or decreasing the butter fat content or to pasteurization or other heat treatment which does not affect the removal of a material amount of water. The process of this invention provides for sterilizing raw milk without any detrimental scorching effect and without imparting a cooked flavor, such as is found in the evaporated milk products. It will also be appreciated that I have produced a new article of manufacture comprising a can coated with silicone and containing one of the various milk products, herein termed milk, which has been sterilized at a high temperature and yet retains its original palatable flavor and may be stored at room temperature for an indefinite period of time without material detrimental effect.

I claim:

1. The method of processing milk comprising the steps of coating the entire interior surface of a sealable container with a silicone film which is water repellant and innocuous to milk, filling the container with milk and leaving an air space, sealing the container, sterilizing the milk by subjecting the container to a predetermined temperature between about 240° F. and 350° F. for a predetermined time, dependent on the temperature, to bring the milk up to a sterilizing temperature, rotating the container continuously during the period while it is subjected to said temperature and causing an air bubble therein to stir the milk and wipe the container surface while the coating prevents an extensive film of milk from forming and clinging to said surface and being detrimentally affected by the heat, and thereafter cooling the milk rapidly and storing it at room temperature.

2. The method according to claim 1 comprising the step of sterilizing the milk in a container having a coating of dimethylpolysiloxane.

3. The method of processing milk comprising the steps of coating the entire interior surface of a container and its cover with a film of dimethylpolysiloxane, homogenizing raw milk, filling the container nearly full with the milk, sealing the cover in place, heating the container in a bath of steam held under pressure to sterilize the milk at about 265° F. within a heating period of about 4 minutes, while constantly rotating the container about an axis therein to cause the air therein to form a bubble and move entirely around the interior of the can and stir all of the milk steadily and wherein the container coating prevents the formation of an extensive film of milk between the bubble and the can and minimizes abnormal heating and scorching of the milk, thereafter quickly cooling the milk in a water bath, and storing it indefinitely at room temperature.

References Cited in the file of this patent
UNITED STATES PATENTS

| 2,477,787 | Cook | Aug. 2, 1949 |
| 2,517,542 | Clifcorn et al. | Aug. 8, 1950 |
| 2,622,598 | Rosenblum | Dec. 23, 1952 |

OTHER REFERENCES

Food Engineering, July 1954, pp. 121, 135.